United States Patent [19]

Ito et al.

[11] Patent Number: 4,651,067
[45] Date of Patent: Mar. 17, 1987

[54] APPARATUS FOR DRIVING BRUSHLESS MOTOR

[75] Inventors: Takayasu Ito; Hideo Nishijima; Isao Fukushima; Yoshio Fujimori, all of Katsuta; Yasunori Kobori, Yokohama, all of Japan

[73] Assignees: Hitachi, Ltd., Tokyo; Hitachi Video Engineering, Incorporated, Kanagawa, both of Japan

[21] Appl. No.: 703,906

[22] Filed: Feb. 21, 1985

[30] Foreign Application Priority Data

Feb. 24, 1984 [JP] Japan .................................. 59-32376
Mar. 27, 1984 [JP] Japan .................................. 59-57437

[51] Int. Cl.⁴ ............................................... H02P 6/02
[52] U.S. Cl. .................................... 318/254; 318/138; 318/439
[58] Field of Search ................... 318/138, 254 A, 254, 318/439

[56] References Cited

U.S. PATENT DOCUMENTS

| | | | |
|---|---|---|---|
| 3,584,280 | 6/1971 | Inagaki | 318/138 X |
| 3,757,185 | 9/1973 | Brunner et al. | 318/254 A |
| 3,891,904 | 6/1975 | Pollmeier | 318/138 X |
| 3,916,272 | 10/1975 | Grunleitner | 318/138 |
| 3,942,083 | 3/1976 | Takahashi et al. | 318/138 |
| 4,051,420 | 9/1977 | Tanikoshi | 318/254 A |
| 4,442,386 | 4/1984 | Uchida et al. | 318/254 |
| 4,535,276 | 8/1985 | Yokobori | 318/439 X |

Primary Examiner—Bernard Roskoski
Assistant Examiner—Bentsu Ro
Attorney, Agent, or Firm—Antonelli, Terry & Wands

[57] ABSTRACT

An apparatus for driving a brushless motor, in which a ripple appearing in the rotation torque of the motor is cancelled by driving the motor with a signal current whose phase is opposite to that of and which has a waveform symmetrical with that of the torque ripple waveform, so that the motor can rotate accurately without any speed variation. In order to obtain such a signal current waveform, counter-electromotive forces induced in the stator coils of the motor are detected, and the level of the signal indicative of the detected counter-electromotive forces is controlled depending on the load and rotation speed of the motor to provide a control signal for controlling the motor drive current.

15 Claims, 13 Drawing Figures

APPARATUS FOR DRIVING BRUSHLESS MOTOR

BACKGROUND OF THE INVENTION

This invention relates to an apparatus for driving a brushless motor used in, for example, a video tape recorder (VTR).

Brushless DC motors are most frequently used now as capstan drive motors or cylinder drive motors in video tape recorders. In such a brushless DC motor, a permanent magnet is used as its rotor, and a plurality of armature coils of different phases, for example, three phases are disposed in the stator. The principle of electromagnetic induction between the current supplied to the stator coils and the magnetic field generated by the permanent magnet forming the rotor is utilized to produce the rotation torque rotating the rotor. In the motor, the stator coils of the individual phases are selectively energized depending on the angular position of rotation of the rotor to continuously develop the rotation torque.

The structure and operation of a three-phase brushless DC motor which is a most typical example of the brushless DC motor will be described before describing the present invention in detail.

Figure 1:
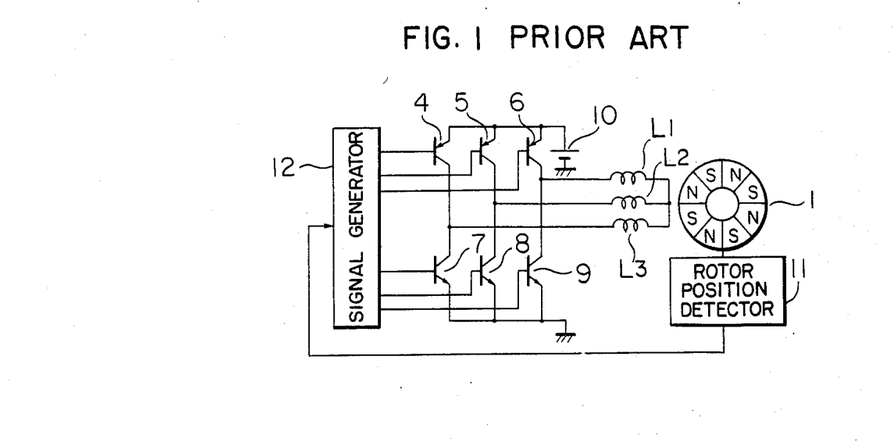
FIG. 1 is a circuit diagram showing a prior art three-phase brushless DC moto of the bipolar drive type and a driving it therefor.

A prior art, three-phase brushless DC motor of the bipolar drive type and a driving circuit therefor are shown in FIG. 1. In the bipolar drive type of brushless DC motor, current is supplied to its stator coils in two directions. Referring to FIG. 1, the brushless DC motor includes a permanent-magnet rotor 1, and three-phase stator coils $L_1$, $L_2$ and $L_3$. A rotor position detector 11 detects the instant angular position of the rotating rotor 1, and a signal generator 12 generates a signal to selectively drive a plurality of transistors 4 to 9 in response to the output of the rotor position detector 11. The transistors 4 to 9 are connected at their collectors to a common power source 10. An upper one and a lower one of the transistors 4 to 9 in FIG. 1 are simultaneously turned on so that the current from the power source 10 is supplied through the conducting transistors to two of the three stator coils $L_1$ to $L_3$ for a predetermined period of time. The stator coils to which the current is supplied are determined by the transistors which are turned on, and the signal generator 12 generates the transistor drive signal at predetermined timing determined by the angular position of rotation of the rotor 1 so as to drive corresponding ones of the transistors 4 to 9. The quantity of current supplied to the individual stator coils $L_1$ to $L_3$ is determined on the basis of the desired rotation speed of the motor.

In such a prior art brushless DC motor, the density of the magnetic flux generated from the permanent magnet and crossing the coils changes substantially in a sinusoidal fashion from the aspect of the electrical angle. Consequently, the rotational force generated by the electromagnetic induction changes also depending on the angular position of rotation of the rotor 1. Therefore, the torque causing the rotation of the rotor 1 of the motor includes necessarily a torque ripple, that is, a variation of the rotation speed. Appearance of such a torque ripple has been an especially serious problem for a motor such as a VTR motor required to rotate accurately at a constant speed, and such a problem has necessarily occurred in a polyphase brushless motor.

The mechanism of occurrence of such a turque ripple will now be described with reference to FIGS. 2 and 3.

Figure 2:
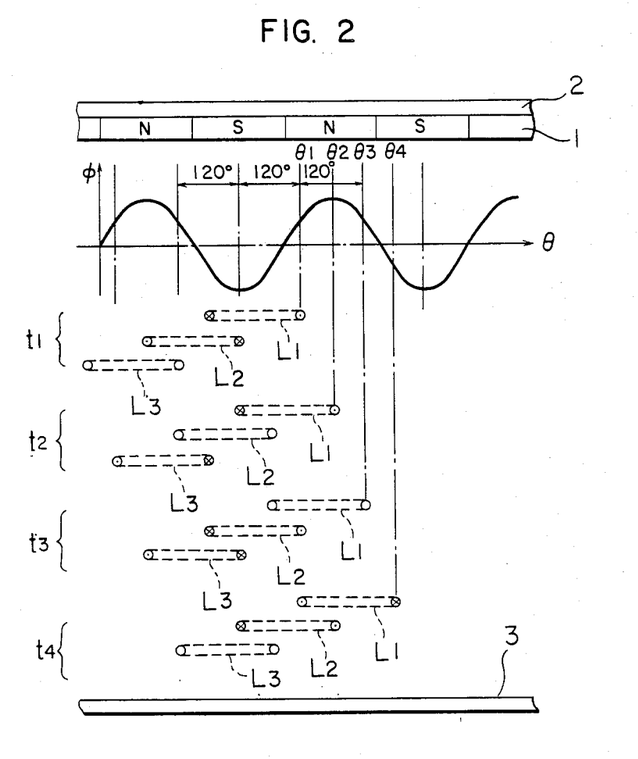
FIG. 2 illustrates the positional relationship between the rotor and the stator coils of the three-phase brushless DC motor shown in FIG. 1.

FIG. 2 shows, in a developed view, the relation between the rotor 1 and the stator coils $L_1$ to $L_3$ of the three-phase brushless DC motor shown in FIG. 1. For ease of explanation, it is supposed that the rotor 1 is held stationary, and the stator coils $L_1$ to $L_3$ are movable, and, thus, the relation is contrary to the practical case. Referring to FIG. 2, reference numerals 2 and 3 designate yokes on the rotor side and stator side respectively, and the stator coils $L_1$ to $L_3$ cross the lines of magnetic flux emanating from the adjacent S and N poles of the permanent magnet and passing through the yokes 2 and 3. In each of the stator coils $L_1$ to $L_3$, the black dot symbol indicates the direction of current flowing perpendicularly toward the front side of the drawing sheet, while the symbol X indicates the direction of current flowing perpendicularly toward the back side of the drawing sheet. It is supposed now that the stator coils are movable. Therefore, FIG. 2 illustrates how the stator coils $L_1$ to $L_3$ move relative to the rotor 1 with lapse of time from $t_1$ to $t_2$, $t_2$ to $t_3$, and $t_3$ to $t_4$. As described already, it is supposed that the stator coils $L_1$ to $L_3$ move relative to the rotor 1 for conveniences of explanation, although actually the rotor 1 rotates relative to the stator coils $L_1$ to $L_3$. Therefore, the stator coils $L_1$ to $L_3$ move rightward in FIG. 2, thereby producing a positive torque to cause rotation of the motor. In other words, it can be said, on the contrary, that the stator coils $L_1$ to $L_3$ are held stationary, and the positive torque acts on the rotor 1 to cause leftward movement of the rotor 1.

The magnetic field established by the permanent magnet is distributed substantially in a sinusoidal fashion as shown in FIG. 2. In FIG. 2, the horizontal axis represents the electrical angle $\theta$, and the vertical axis represents the magnetic flux density $\phi$. Each of the stator coils $L_1$, $L_2$ and $L_3$ is wound to cover an electrical angle of 180° (that is, the width of any one of the N or S poles of the permanent magnet), and these stator coils $L_1$, $L_2$ and $L_3$ are disposed with a phase difference of 120° in electrical angle therebetween.

Figure 3:
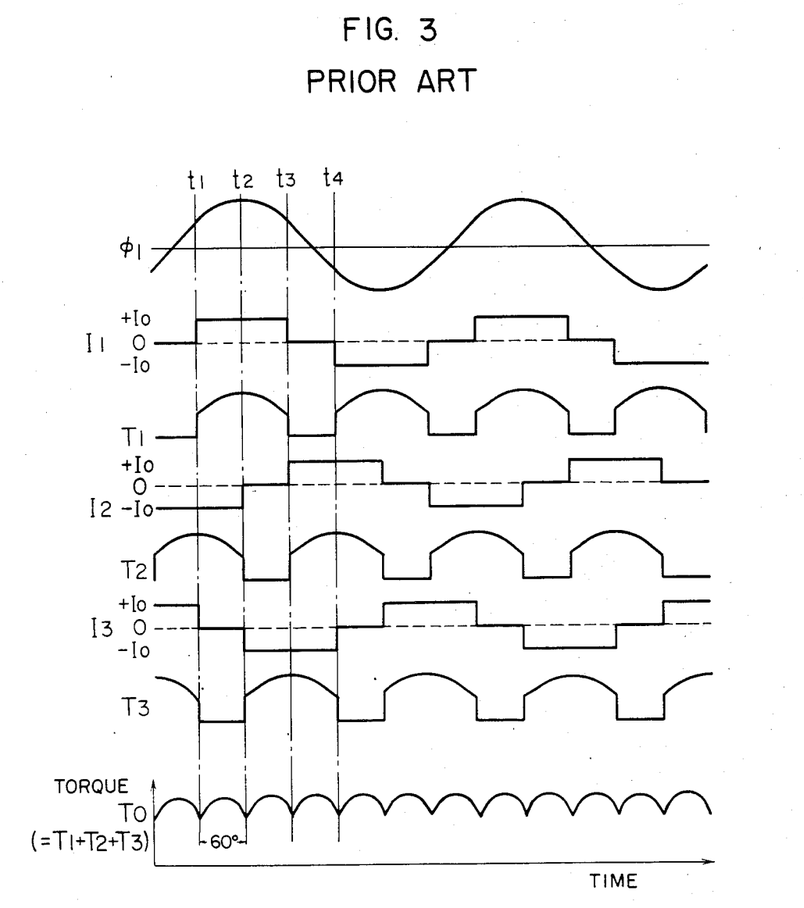
FIG. 3 is a waveform diagram showing the operating waveforms appearing in the circuit shown in FIG. 1.

FIG. 3 shows how curents $I_1$ to $I_3$ supplied to the respective stator coils $L_1$ to $L_3$, torques $T_1$ to $T_3$ produced as a result of the supply of the respective currents $I_1$ to $I_3$, and the composite torque $T_0$ ($=T_1+T_2+T_3$) change relative to time in the apparatus shown in FIG. 1.

Suppose now that the motor drive currents $I_1$ and $I_2$ are supplied to the respective stator coils $L_1$ and $L_2$ at time $t_1$ at which the leading end of the stator coil $L_1$ takes the position of the electrical angle $\theta_1$ shown in FIG. 2. That is, suppose that a predetermined base drive current is supplied to each of the transistors 6 and 8 from the signal generator 12. Then, the transistors 6 and 8 are turned on in response to the supply of the predetermined quantity of base drive current to each of their bases, and the predetermined current flows through the route which is traced from the power source 10→transistor 6 →coil $L_1$→coil $L_2$→transistor 8 to the ground. At this time, the remaining transistors are in their cut-off state. Then, when the leading end of the stator coil $L_1$ reaches the position of the electrical angle $\theta_2$ at time $t_2$, the stator coil $L_2$ is de-energized, and the stator coil $L_3$ is energized in turn. That is, the transistors 6 and 7 are now turned on, and the predetermined current flows through the route which is traced from the power source 10→transistor 6→coil $L_1$→coil $L_3$→transistor 7 to the ground. Then, when the leading end of the stator coil $L_1$ reaches the position of the electrical angle $\theta_3$ at time $t_3$, the transistors 5 and 7 are now turned on while turning off the remaining transistors, and the predetermined current is supplied to the stator coils $L_2$ and $L_3$. In the manner above described, the transistors are selectively turned on and off under control of the signal from the signal generator 12 each time a predetermined positional relationship is established between the stator coils and the rotor, and the predetermined current is supplied to the corresponding stator coils to attain continuous rotation of the motor. In the illustrated example, the current supply to the stator coils is changed over at the angular interval of the electrical angle of 60°. Thus, there are six modes of coil energization, and one cycle of these modes causes one complete revolution (360°) of the motor. For the purpose of detection of the positional relationship between the stator coils and the rotor, a known rotation position detector such as that using a Hall element can be utilized. Also, the electrical angle between the positions $\theta_1$ and $\theta_3$ supplying the current to the stator coils is preferably selected to cover a range of 120° around the position $\theta_2$ where the magnetic flux density is maximum, in order to achieve a high efficiency.

The torque $T_1$ shown in FIG. 3 is produced by the coaction of the current $I_1$ supplied to the stator coil $L_1$ and the magnetic flux generated from the rotor 1 in the period from time $t_1$ to time $t_2$, and it will be seen that the magnitude of this torque $T_1$ depends upon the density $\phi_1$ of the magnetic flux crossed by the leading end of the coil $L_1$. In FIG. 3, $I_0$ designates the current value corresponding substantially to the predetermined rotation speed of the motor. Also, the torque $T_2$ shown in FIG. 3 is produced by the coaction of the current $I_2$ supplied to the stator coil $L_2$ and the magnetic flux generated from the rotor 1 in the period from time $t_1$ to time $t_2$. (In this case, the density $\phi_2$ of the magnetic flux crossed by the leading end of the stator coil $L_2$ is phase-shifted by 120° relative to $\phi_1$). In this period, the current $I_3$ supplied to the stator coil $L_3$ is zero, and the torque $T_3$ is also zero.

In the period from time $t_2$ to time $t_3$, the transistors are switched over to de-energize the stator coil $L_2$ and energize the stator coil $L_3$ thereby producing the torques $T_1$ and $T_3$. In the period from time $t_3$ to time $t_4$, the transistors are switched over to de-energize the stator coil $L_1$ and energize the stator coil $L_2$ thereby producing the torques $T_2$ and $T_3$.

Although the direction of the current supplied to the stator coil $L_1$ is reversed at time $t_4$, the direction of the magnetic flux crossed by the leading end of the coil $L_1$ at that time is also reversed as shown in FIG. 2. Consequently, the direction of the produced torque $T_1$ remains positive. The currents $I_1$, $I_2$ and $I_3$ supplied to the respective stator coils $L_1$, $L_2$ and $L_3$ produce a composite torque $T_0 = T_1 + T_2 + T_3$. However, in this composite torque $T_0$ imparted to the rotor 1, a torque variation occurs at an angular interval of 60° as shown in the lowest portion of FIG. 3. Therefore, the prior art brushless DC motor has been defective in that a flywheel must be used to absorb the variation of the rotation speed of the motor attributable to such a torque ripple. Also, when the motor is driven intermittently at a period shorter than the period of the torque ripple (as, for example, in the case of the so-called fine-slow playback mode in which a tape in a VTR is driven intermittently at the standard speed), there has been such a problem that the desired intermittent drive with high accuracy cannot be achieved.

Further, Japanese Patent Application Laid-open No. 55-79694 filed in Japan on Dec. 12, 1978 by Tokyo Shibaura Electric Co., Ltd. discloses a method for driving a brushless motor with a drive current having a phase opposite to that of the aforementioned torque variation in order to compensate the torque variation in the motor. According to the disclosed method, the relation between the angular position of rotation of the motor and the associated torque variation is stored previously in a memory, and the amount of the torque variation corresponding to the detected angular position of rotation of the motor is read out from the memory, so that, on the basis of the read-out amount of the torque variation, the motor drive current can be suitably controlled by a microcomputer. Therefore, the disclosed method has been defective in that a memory and a microcomputer resulting in a cost increase are essentially required in addition to the necessity for previously finding the relation between the torque variation and the angular position of rotation of the motor.

SUMMARY OF THE INVENTION

With a view to obviate the defects and problems of the prior art apparatus, it is a primary object of the present invention to provide an apparatus for driving a brushless DC motor, which can eliminate appearance of the motor torque ripple at whatever rotation speed of the motor.

In accordance with the present invention which attains the above object, there is provided an apparatus for driving a brushless motor including a rotor and a plurality of stator coils, said apparatus comprising a device for detecting the angular position of rotation of the rotor, a signal generating device for generating a control signal in response to the application of the detected position signal from the position detecting device thereby controlling the timing of energization of each of the stator coils of the motor, a motor driving circuit for supplying a motor drive current from a power source to each of the stator coils of the motor under control of the control signal generated from the signal generating device, a compensation signal generating circuit including means for detecting counter-electromotive forces (voltages) induced in the stator coils during rotation of the rotor thereby generating a signal for compensating a torque ripple of the rotation torque in the motor on the basis of a signal indicative of the detected counter-electromotive forces and a signal indicative of the rotation speed of the motor, and a current control circuit including means for superposing the torque ripple compensation signal on a command signal commanding a predetermined rotation speed of the motor, and, on the basis of the resultant signal, controlling the motor drive current supplied through the motor driving circuit.

It is the fundamental concept of the present invention that, in the period where the torque has heretofore been reduced due to the torque ripple, the drive current is increased to compensate the reduced torque. For this purpose, it is necessary to obtain a signal indicative of the current variation corresponding to the torque variation. The torque T produced on the stator coil is generally expressed as $T \propto B \cdot I$, where B is the magnetic flux density, and I is the current value. Further, the counter-electromotive force (voltage) E induced in the stator coil is generally expressed as $E \propto B \cdot v$, where v is the rotation speed of the motor. Thus, the counter-electromotive force E is proportional to the magnitude of the torque T. It is, therefore, the fundamental idea of the present invention that the counter-electromotive force is detected to obtain the compensation current. Further, the latter expression teaches that the counter-electromotive force depends upon the rotation speed of the motor. Therefore, since a change in the rotation speed of the motor results in a corresponding change of the counter-electromotive force, it is necessary to correspondingly change the compensation current. The present invention is featured by the attainment of these objectives.

DESCRIPTION OF THE PREFERRED EMBODIMENTS

Figure 4:
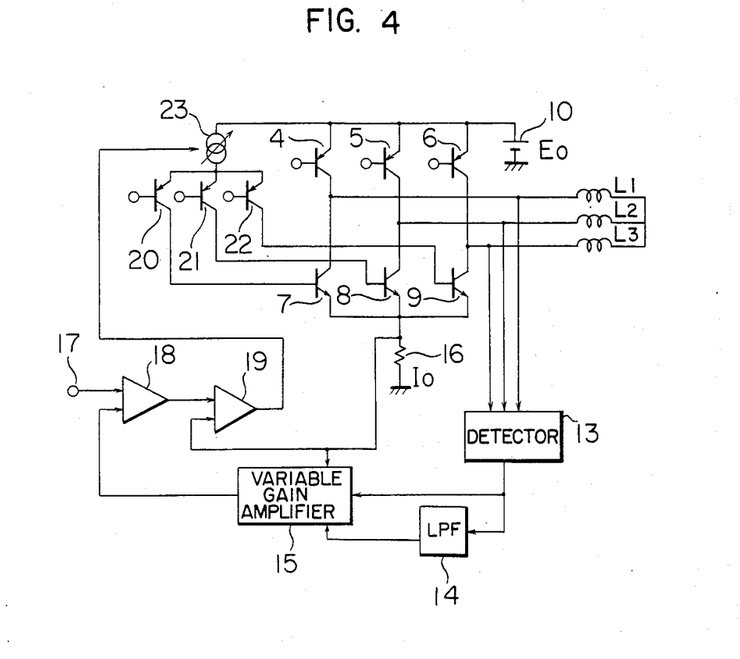
FIG. 4 is a block diagram of a preferred embodiment of the driving apparatus according to the present invention.

Referring now to the drawings, FIG. 4 is a block diagram of an embodiment of the driving apparatus of the present invention for driving a three-phase brushless DC motor. In FIG. 4, the same reference numerals are used to designate the same or equivalent parts appearing in FIG. 1.

Referring to FIG. 4, the driving apparatus includes a detector 13, a low-pass filter (LPF) 14, a variable gain amplifier 15, a resistor 16 having a very small resistance value, a speed control input terminal 17, differential amplifiers 18, 19, transistors 20, 21, 22, and a variable current source 23, in addition to the transistors 4 to 9 and the power source 10 shown in FIG. 1. Further, although not shown for simplicity of illustration, a signal generator receiving the output of a rotor position detector is connected to the base terminals of the transistors 4 to 6 and 20 to 22 as in the case of FIG. 1, so as to drive suitable ones of the transistors in response to the detection of the angular position of rotation of the rotor.

The operation of the embodiment of the present invention having the structure shown in FIG. 4 will be described with reference to FIGS. 5 to 7.

The transistors 4 to 9 and 20 to 22 are selectively driven by the signal from the signal generator (not shown) to supply the drive current to each of the individual stator coils $L_1$ to $L_3$ thereby generating the rotation torque. This operation is entirely the same as that described with reference to FIG. 1, and, therefore, its explanation will not be repeated again. In the present embodiment, however, the transistors 4, 5 and 6 operate in a saturation drive (switching mode) to act as on-off means, while the transistors 7, 8 and 9 operate in a non-saturation drive mode (linear amplification mode) to make a constant current operation. When the drive current is supplied to the individual stator coils $L_1$ to $L_3$ in the predetermined order, a counter-electromotive force corresponding to the change of the density of the magnetic flux emanating from the rotor 1 is induced in each of the stator coils $L_1$ to $L_3$. As described already, the waveform of the counter-electromotive force induced in each of the stator coils $L_1$ to $L_3$ shows a very good correspondence with the waveform of the torque produced by the current supplied to the stator coil. If the transistors 4, 5 and 6 operate in the non-saturation drive mode, counter-electromotive forces $e_1$, $e_2$ and $e_3$ each having a substantially sinusoidal waveform as shown in FIG. 5 should appear at the connection points between the stator coils $L_1$ to $L_3$ and the transistors 4 to 6 respectively. These counter-electromotive forces $e_1$, $e_2$ and $e_3$ correspond to those induced in the stator coils $L_1$, $L_2$ and $L_3$ respectively. However, the transistors 4, 5 and 6 operate in the saturation drive mode, while the transistors 7, 8 and 9 operate in the non-saturation drive mode in the embodiment of the present invention. Therefore, when, for example, the transistor 4 is turned on, the potential at the connection point between the stator coil $L_1$ and the transistor 4 is fixed at the power supply voltage $E_0$ of the power source 10 in the on-duration of the transistor 4. That is, the level of the counter-electromotive force $e_1$ is pulled up to the level of the power supply voltage $E_0$ in the 120°-period of its waveform shown in FIG. 5. As a result, the levels of the counter-electromotive forces $e_2$ and $e_3$ induced in the remaining stator coils $L_2$ and $L_3$ are also raised by the amount corresponding to the difference between the power supply voltage $E_0$ and the voltage corresponding to the 120°-period portion of the counter-electromotive force $e_1$ in the waveform diagram of FIG. 5. The same applies to the case where any one of the other counter-electromotive forces $e_2$ and $e_3$ induced in the respective stator coils $L_2$ and $L_3$ is fixed at the level of the power supply voltage $E_0$.

Figure 6:
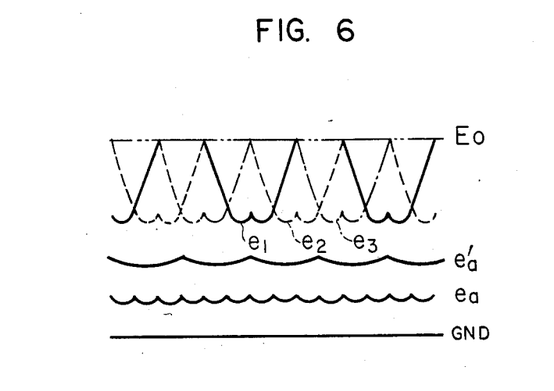
FIG. 6 is a waveform diagram showing the waveform of a signal indicative of the counter-electromotive forces detected by the detector provided in the driving apparatus of the present invention shown in FIG. 4.

Therefore, each of the counter-electromotive forces $e_1$, $e_2$ and $e_3$ induced in the stator coils $L_1$, $L_2$ and $L_3$ respectively has a waveform whose maximum voltage value is fixed at the power supply voltage $E_0$ and which has two peaks on the low level side as shown in FIG. 6.

The counter-electromotive forces $e_1$, $e_2$ and $e_3$ having waveforms as shown in FIG. 6 are applied to the detector 13. The detector 13 detects the low-level side waveforms and generates a detection output signal $e_a$ having a waveform as shown in FIG. 6. It will be apparent that this detection output waveform $e_a$ is symmetrical with and has a phase opposite to that of the waveform of the composite torque $T_0$ including the torque ripple shown in FIG. 3. This detection output signal $e_a$ is applied to the variable gain amplifier 15 to be amplified up to a predetermined amplitude, and such a signal is applied to one of the input terminals of the differential amplifier 18 as a torque ripple compensation signal. A command signal commanding the rotation speed of the motor is applied to the other input terminal of this differential amplifier 18, and the resultant output signal of the differential amplifier 18 is applied to one of the input terminals of the differential amplifier 19. A signal indicative of the voltage drop across the resistor 16 is applied to the other input terminal of this differential amplifier 19. That is, a voltage drop dependent upon the value of the motor drive current $I_0$ appears across the resistor 16, so that a variation of the drive current $I_0$ due to a fluctuation of, for example, the current amplification factor $h_{FE}$ of the transistor can be detected.

In other words, when the transistors 4 and 21 are turned on, the base current is supplied from the current source 23 to the transistor 8, and the collector current which is $h_{FE}$ (the current amplification factor of the transistor 8) times as large as the base current is supplied to the stator coils $L_1$ and $L_2$ from the transistor 4 as the drive current. Similarly, when the transistor 20 or 22 is turned on, the base current is supplied from the current source 23 to the transistor 7 or 9, and the collector current which is $h_{FE}$ (the current amplification factor of the transistor 7 or 9) times as large as the base current is supplied to the associated stator coils as the drive current. Unless the individual transistors 7, 8 and 9 have the same current amplification factor $h_{FE}$, the drive current supplied to the coils will vary whenever the conducting transistors are switched over, and this is undesirable from the aspect of control. Therefore, the gain of the differential amplifier 19 is selected to be sufficiently high, and feedback control is made so that the voltage drop across the resistor 16 becomes equal to the output of the differential amplifier 18. Thus, the undesirable variation of the drive current due to the fluctuation of $h_{FE}$ of the transistors 7, 8 and 9 can be minimized.

Thus, the signal indicative of the value of the motor drive current $I_0$ and the current command signal having the torque ripple compensated by the differential amplifier 18 are applied to the differential amplifier 19. On the basis of these inputs, the differential amplifier 19 controls the output current value of the variable constant-current source 23. That is, feedback control is made until coincidence is reached between the signal indicative of the detected motor current $I_0$ and the output signal of the differential amplifier 18, while, at the same time, compensating the torque ripple occurred in the motor rotation torque.

Figure 7:
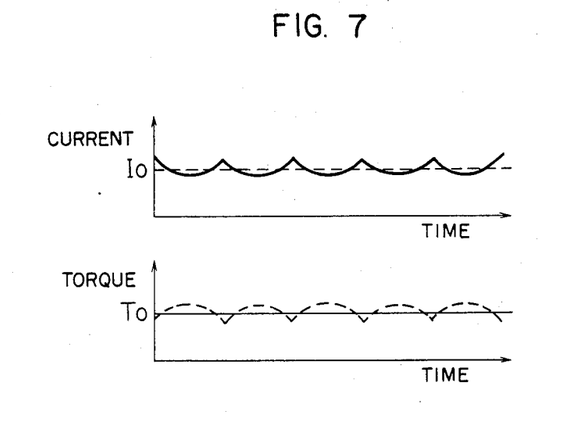
FIG. 7 is a waveform diagram showing the current and torque waveforms relative to time in the driving apparatus of the present invention shown in FIG. 4.

FIG. 7 is a waveform diagram showing the effect of the torque ripple compensation above described. In FIG. 7, the broken curves represent the current and torque characteristics of the prior art brushless motor, while the solid curves represent those of the motor driven by the apparatus of the present invention. It will be seen in FIG. 7 that a torque ripple as indicated by the broken curve has appeared in the composite torque $T_0$ since the drive current $I_0$ has been controlled to be maintained constant as indicated by the broken line in the case of the prior art driving apparatus. In contrast, in the case of the driving apparatus of the present invention, the composite torque $T_0$ is maintained constant as indicated by the solid line since the motor is driven with the current $I_0$ which compensates the ripple component.

The operation of the variable gain amplifier 15 will be further described. When the motor drive current $I_0$ increases with the increase of the load, the motor rotation torque $T_0$ increases too. Therefore, the absolute value of the torque ripple component increases too. In such a case, it is also necessary to increase the amplitude of the torque ripple compensation signal. Further, in an apparatus (for example, a VTR having different record/playback speed modes) where the rotation speed of the motor can be changed over between a plurality of speed stages, there is not any substantial change in the load regardless of a change in the rotation speed of the motor, and, therefore, there is not any appreciable change in the absolute value of the torque ripple. On the other hand, however, the peak-to-peak value of the counter-electromotive force induced in each of the stator coils becomes larger and smaller with the increase and decrease in the rotation speed of the motor respectively. Accordingly, when the rotation speed of the motor is changed in such an apparatus, the level of the detected counter-electromotive force must be increased or decreased depending on the changed rotation speed thereby providing the desired compensation signal. In other words, it is necessary to increase (decrease) the amplitude of the compensation signal to deal with an increase (a decrease) of the load and to decrease (increase) the amplitude of the compensation signal to deal with an increase (a decrease) of the rotation speed. The variable gain amplifier 15 is a device in which the level of the detected counter-electromotive force is increased or decreased depending on the coil drive current $I_0$ and motor rotation speed so as to provide the torque ripple compensation signal which is optimum for the control.

In FIG. 6, the curve $e_a$ represents the output waveform of the detector 13 detecting the counter-electromotive forces when the motor rotates at its standard speed, while the curve $e_a'$ represents the output waveform of the detector 13 detecting the counter-electromotive forces when the motor rotates at a speed which is $\frac{1}{3}$ of the standard speed. When the motor rotates at the low speed which is $\frac{1}{3}$ of the standard speed, the counter-electromotive force has a value which is $\frac{1}{3}$ of that appeared at the standard speed, and its frequency is also $\frac{1}{3}$ of that appeared at the standard speed. Also, the DC level of the low-level-side detection output waveform $e_a'$ of the detector 13 in such a case is higher than that of the waveform $e_a$ as shown in FIG. 6. (That is, although the peak-to-peak level of the counter-electromotive forces induced in the stator coils decreases due to the reduced rotation speed of the motor, the DC level of the low-level-side detection output of the detector 13 shows an increase.) In the embodiment shown in FIG. 4, the detection output of the detector 13 is divided into two portions, one of which is applied directly to one of the input terminals of the variable gain amplifier 15, while the other of which is applied to the low-pass filter (LPF) 14 from which the extracted DC component is applied to the other input terminal of the variable gain amplifier 15. In response to the application of the voltage drop signal (indicative of the detected drive current) from the resistor 16 together with the DC component signal (indicative of the detected rotation speed) of the detection output from the detector 13, the gain of the variable gain amplifier 15 is suitably controlled, so that the level of the detection output $e_a$ ($e_a'$) is regulated to produce the optimum torque ripple compensation signal.

The embodiment of the present invention shown in FIG. 4 illustrates an application of the present invention to an apparatus in which the motor rotation speed is variable. However, in another application of the present invention to an apparatus in which the motor rotation speed need not be variable, the gain of the variable gain amplifier 15 need not follow up the change in the motor rotation speed. In the latter application, the LPF 14 shown in FIG. 4 is unnecessary, and, in lieu thereof, a constant voltage corresponding to the predetermined rotation speed of the motor may be applied to the input terminal of the variable gain amplifier 15 to which the output of the LPF 14 has been connected.

Figure 8:
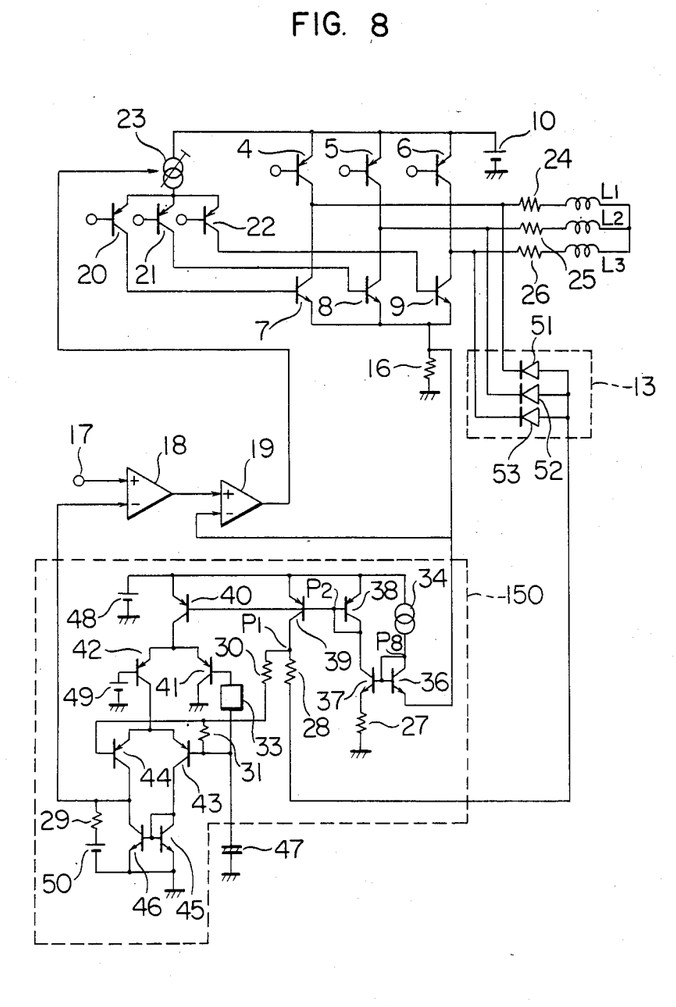
FIG. 8 is a circuit diagram showing the detailed structure of the driving apparatus of the present invention shown in FIG. 4.

FIG. 8 is a circuit diagram showing the detailed structure of the embodiment shown in FIG. 4. Referring to FIG. 8, the circuit includes resistors 24 to 31, a level shift circuit 33, a constant-current source 34, transistors 36 to 46, a capacitor 47, constant-voltage sources 48 to 50, and diodes 51 to 53, in addition to those shown in FIG. 4 already. Further, the reference numeral 150 designates a compensation signal generating circuit having both of the function of the LPF 14 and the function of the variable gain amplifier 15 shown in FIG. 4. The rotor position detector and the signal generator are not shown for simplicity of illustration.

The practical stator coils $L_1$, $L_2$ and $L_3$ have a resistance component besides the inductance, and such resistance components are shown by the resistors 24, 25 and 26 respectively. Due to the presence of such resistance components, the voltage drops across the resistors 24 to 26 are superposed as errors on the true counter-electromotive forces detected by the detector 13, with the result that an accurate compensation signal cannot be obtained. In order to obviate the adverse effect of the voltage drops across the resistors 24 to 26, the resistor 28 and the transistor 39 are incorporated in the compensation signal generating circuit 150 to which the outputs of the diodes 51, 52 and 53 constituting the detector 13 are applied.

More precisely, the voltage signal indicative of the value of the motor drive current $I_0$ is applied from the resistor 16 to an amplifier of grounded emitter configuration constituted by th diode-connected transistor 36, the transistor 37, and the emitter resistor 27 of the transistor 37. The transistor 37 is connected at its base to the connection point $P_8$ between the transistor 36 and the constant-current source 34 supplying the bias current to the transistor 36.

The collector output of the transistor 37 is applied to the resistor 28 through a current mirror circuit constituted by the diode-connected transistor 38 and the transistor 39.

The resistors 24, 25 and 26 have substantially equal resistance values, and two of the three stator coils $L_1$, $L_2$ and $L_3$ are always energized. Thus, for example, the individual resistance values are so selected that the ratio between the value two times as large as the reistance value of each of the resistors 24 to 26 and the resistance value of the resistor 16 is equal to the ratio between the resistance values of the resistors 28 and 27. When the resistance values are selected as described above, the voltage drop across the resistor 28 becomes equal to the voltage drops across the resistors 24 to 26, so that a signal for cancelling the above voltage drop can be derived from the connection point $P_1$ between the transistor 39 and the resistor 28. The resistors 30, 31 and the capacitor 47 constitute the lowpass filter (LPF) which detects the DC level (indicative of the rotation speed of the motor) of the true counter-electromotive force detection signal appearing at the point $P_1$. The output current of the constant-current source 34 is selected to be sufficiently small or negligible when compared to the motor drive current $I_0$.

The detection signal indicative of the true counter-electromotive forces and appearing at the point $P_1$ is applied through the resistor 30 to the base of the transistor 44. On the other hand, the DC level signal from the LPF is applied to the base of the transistor 43. The transistors 43 and 44 constitute a differential amplifier. The transistor 40 serves as a constant-current source for this differential amplifier. The transistor 40 is connected at its base to the connection point $P_2$ between the base and the collector of the transistor 38, so that the quantity of current flowing through the transistor 40 can change in proportion to the voltage drop across the resistor 16 (hence, in proportion to the motor drive current $I_0$).

By the function of the combination of the resistors 30, 31 and the capacitor 47, the DC potential at the base of the transistor 43 becomes equal to that at the base of the transistor 44. Therefore, the base DC potential of the differential amplifier change according to the rotation speed of the motor. The higher (lower) the rotation speed of the motor, the DC level drops or rises.

Utilizing the above relation, a signal corresponding to or indicative of the rotation speed of the motor is produced by the level shift circuit 33 on the basis of the base potential of the transistor 43. This signal is applied to one of the input terminals of the differential amplifier constituted by the transistors 41 and 42. Since the DC level of the signal appearing at the point $P_1$ is high at a low rotation speed of the motor, the substantial portion of the current from the constant-current source provided by the transistor 40 flows through the transistor 42 to be supplied to a differential amplifier constituted by the transistors 43 and 44.

When the motor rotates at a higher speed, the DC level of the signal appearing at the point $P_1$ becomes lower, thereby decreasing the current supplied to the differential amplifier constituted by the transistors 43 and 44. In the manner described above, the counter-electromotive force detection signal is controlled according to the detected rotation speed of the motor to appear from the compensation signal generating circuit 150 as the torque ripple compensation signal. This torque ripple compensation signal is applied to one of the input terminals of the aforementioned differential amplifier 18.

Thus, according to the embodiment of the motor driving apparatus of the present invention, the adverse effect of the DC resistance components included actually in the stator coils $L_1$, $L_2$ and $L_3$ can be eliminated, and a compensation signal exactly proportional to the torque ripple component attributable to the true counter-electromotive forces $e_1$, $e_2$ and $e_3$ can be produced. This compensation signal can also follow up variations of the load and rotation speed.

Figure 9:
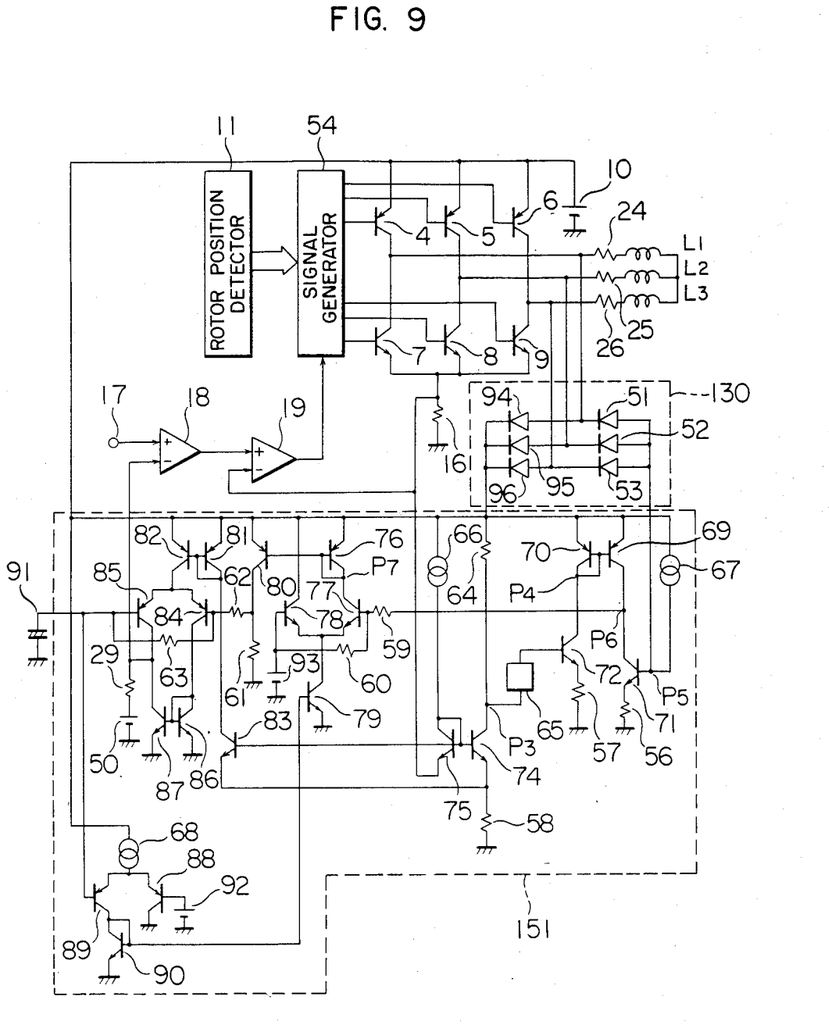
FIG. 9 is a circuit diagram showing the detailed structure of another embodiment of the present invention.

FIG. 9 is a circuit diagram showing the structure of another embodiment of the present invention. In the case of the first embodiment shown in FIGS. 4 and 8, the transistors 4, 5 and 6 operate in a saturation drive mode. In contrast, in the case of this second embodiment, all of the transistors 4, 5, 6, 7, 8 and 9 operate in a non-saturation drive mode. Therefore, the counter-electromotive forces induced in the individual stator coils $L_1$, $L_2$ and $L_3$ have waveforms as shown in FIG. 5. In this case, the difference between the upper-level-side detection output and the lower-level-side detection output of the detector detecting the counter-electromotive force signal shown in FIG. 5 provides a counter-electromotive force detection signal having a waveform similar to that of the detector output $e_a$ shown in FIG. 6.

In FIG. 9, the same reference numerals are used to designate the same or equivalent parts appearing in FIGS. 1, 4 and 8.

Other parts include a signal generator 54, resistors 56 to 64, a level shift circuit 65, constant-current sources 66 to 68, transistors 69 to 90, a capacitor 91, constant-voltage sources 92, 93, diodes 94 to 96, a detector 130, and a compensation signal generating circuit 151. The signal generator 54 generates a signal for controlling the transistors 4 to 9 in response to the input applied from the position detector 11. The detector 130 has a structure different from that of the detector 13 used in the embodiment shown in FIG. 8, and the compensation signal generating circuit 151 has also a structure different from that of the compensation signal generating circuit 150 used in the embodiment shown in FIG. 8.

Figure 5:
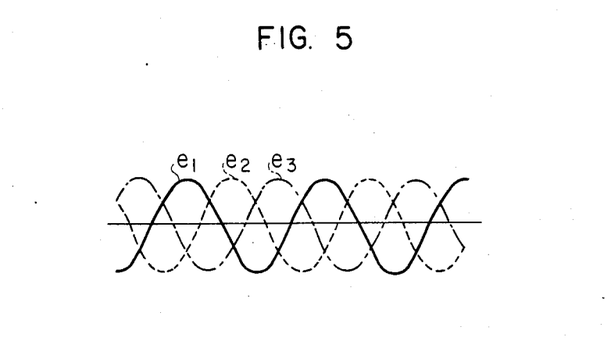
FIG. 5 is a waveform diagram showing the waveforms of counter-electromotive forces induced in the individual stator coils of the motor.

The detector 130 includes the diodes 94 to 96 for detecting both of the upper level side and the lower level side of the waveforms of the counter-electromotive forces $e_1$, $e_2$ and $e_3$ shown in FIG. 5. Further, in order to eliminate the adverse effect of voltage drops due to the resistance components 24 to 26 of the respective stator coils $L_1$ to $L_3$, the resistor 64 is provided in the compensation signal generating circuit 151 to which the outputs of the diodes 94 to 96 are applied.

As in the case of the first embodiment, the resistance value of the resistor 64 is so selected that the voltage appearing across the resistor 64 is two times as large as the voltage drop occurring across each of the resistors 24 to 26 due to the motor drive current $I_0$. Consequently, the counter-electromotive force detection signal provided by detection of the upper level side of the counter-electromotive forces appears at the connection point $P_3$ between the resistor 64 and the transistor 74. The voltage appearing across the resistor 64 is selected to be two times as large as the voltage drop across each of the resistors 24 to 26, because two of the three stator coils $L_1$, $L_2$ and $L_3$ are simultaneously supplied with currents flowing in directions opposite to each other. In the embodiment shown in FIG. 9, the resistor 64 for correcting the error due to the internal resistances is inserted in the upper-level-side detection output line only, and such a resistor is not inserted in the lower-level-side detection output line. That is, the upper-level-side detection output corrected by the resistor 64 is applied to the point $P_3$, while, the lower-level-side detection output not corrected by such a resistor is applied to the point $P_5$, and the signal indicative of the difference between these two outputs appears at the point $P_6$. As a result, the error attributable to the internal resistances of the stator coils can be cancelled. Thus, when the single resistor 64 is used to correct the errors included in both of the upper-level-side detection output and the lower-level-side detection output, the resultant total error is less than when the errors included in these outputs are individually corrected.

The counter-electromotive force detection signal appearing at the point $P_3$ is applied through the level shift circuit 65 to an amplifier of grounded emitter configuration constituted by the transistor 72 and the resistor 57. The transistor 72 is connected at its collector to the connection point $P_4$ between the collector and the base of the transistor 70. This transistor 70 is diode-connected to constitute a current mirror circuit together with the transistor 69.

On the other hand, the outputs of the diodes 51, 52 and 53 detecting the lower levels of the counter-electromotive forces induced in the stator coils $L_1$, $L_2$ and $L_3$ respectively are applied to the connection point $P_5$ between the transistor 71 and the constant-current source 67 supplying the bias current to this transistor 71.

The transistor 71 is connected at its collector to the collector of the transistor 69, so that the difference between their collector currentrs appearing at the connection point $P_6$ is indicative of the difference between the detection waveforms of the upper and lower-levels of the counter-electromotive forces having the waveforms $e_1$, $e_2$ and $e_3$ shown in FIG. 5. This difference between the upper-level detection waveform and the lower-level detection waveform provides such a waveform in which the composite waveform of the lower level of the counter-electromotive forces shown in FIG. 6 is superposed on the composite waveform of the upper level of the counter-electromotive forces. It will be apparent, therefore, that the superposed waveform provides the waveform $e_a$ shown in FIG. 6. At the same time, the DC level representing the difference between the upper-level and lower-level detection waveforms appears also at the point $P_6$. Therefore, when the rotation speed of the motor increases, the upper level of the counter-electromotive forces becomes higher. Consequently, the DC level appearing at the point $P_6$ becomes higher to increase the current of the transistor 72 thereby also increasing the current of the transistor 69. On the other hand, the lower level of the counterelectromotive fores becomes lower thereby decreasing the current of the transistor 71.

Thus, when the rotation speed of the motor is high, the collector current of the transistor 69 flows into the resistor 59. On the other hand, when the motor rotates at a lower speed, the upper level and lower level of the counter-electromotive forces become lower and higher respectively. In such a case, the transistor 71 draws the current through the resistors 60 and 59.

In the manner above described, it is possible to derive the difference (the waveform $e_a$ ($e_a'$) shown in FIG. 6) between the upper-level detection waveform and the lower-level detection waveform of the counterelectromotive forces including the rotation speed information. The signal thus derived is applied to a differential amplifier constituted by the transistors 77 and 78.

The diode-connected transistor 76 is connected to the collector of the transistor 77, and the transistor 80 is connected at its base to the connection point $P_7$ between the collector and the base of the transistor 76 to constitute a current mirror circuit. Therefore, the volage appearing across the resistor 61 changes depending on the DC level of the signal $e_a$ ($e_a'$) applied to this differential amplifier.

Therefore, the base potentials of the transistors 84 and 85 become equal to each other by the function of the combination of the resistors 62, 63 and the capacitor 91, and the base potential of the transistor 89 changes in relation to the base potentials of the transistors 84 and 85 changing depending on the DC level of the signal $e_a$ ($e_a'$)

The current mirror circuit constituted by the diode-connected transistor 90 and the transistor 79 acts to change the gain of the differential amplifier constituted by the transistors 77 and 78.

At the same time, the variation of the drive current $I_0$ detected by the resistor 16 is converted into the corresponding base potential changes of the diode-connected transistor 75 and the transistor 83. The current mirror circuit constituted by the diode-connected transistor 81 and the transistor 82 acts as a curent source for a differential amplifier composed of the transistors 84 and 85. Thus, the gain of the differential amplifier composed of the transistors 84 and 85 is variable depending on the variation of the motor drive current $I_0$.

It will thus be seen that the present invention provides a driving circuit in which the component $e_a$ ($e_a'$) obtained by detection of the counter-electromotive forces induced in the stator coils is utilized to prevent appearance of a torque ripple at whatever rotation speed of the motor. The driving circuit of the present invention provides such a merit that it can be applied to any other motors having different resistance components of stator coils by merely replacing the resistor 58. Thus, the driving circuit of the present invention is suitable to be integrated in the form of an IC.

The aforementioned embodiments of the present invention have referred to an application of the present invention to a three-phase brushless DC motor. It is apparent, however, that the present invention is also applicable to a single-phase brushless DC motor. Such an embodiment of the present invention will be described now with reference to FIGS. 10 to 13.

Figure 10:
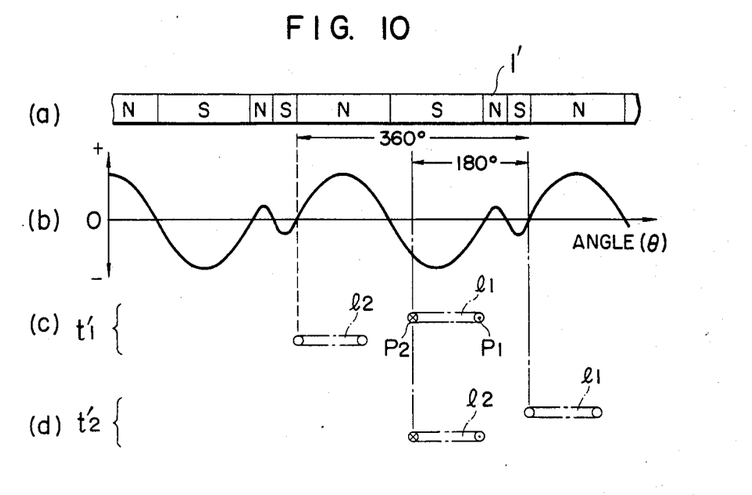
FIG. 10 illustrates the positional relationship between a rotor and stator coils in a single-phase brushless DC motor of the unipolar drive type.

FIG. 10 illustrates the rotating operation of a single-phase brushless DC motor, wherein FIG. 10 (a) is a developed view of the rotor of the motor, FIG. 10 (b) shows the density distribution of magnetic flux generated from the magnetic poles of the rotor, and FIGS. 10 (c) and 10 (d) illustrate the positions of the stator coils relative to the rotor at times $t_1'$ and $t_2'$ respectively. FIG. 10 corresponds to FIG. 2 showing the case of the three-phase brushless DC motor. In the case of the three-phase motor, the currents supplied to the individual stator coils have a phase difference of 120° therebetween. However, in the case of the single-phase motor, the currents are alternately supplied to the individual stator coils at an angular interval of 180° Therefore, there is a point at which the values of the currents supplied to the stator coils are simultaneously zero, and, in such a case, the motor cannot be started. To avoid such a situation, the single-phase DC motor employs a magnetic pole arrangement different from that of the three-phase motor, as shown in FIG. 10 (a).

In the rotor 1' of the single-phase brushless DC motor, N and S poles occupying a larger region are alternately arranged, and N and S poles occupying a smaller region are interposed in alternate ones of the boundaries between the large N and S poles, as seen in FIG. 10 (a). The magnetic pole arrangement in FIG. 10 (a), when viewed from the left toward the right, is such that the combination of the small N and S poles is interposed in that order between each of the large S poles and the next large N pole. Consequently, the magnetic flux emanating from the rotor 1' has a density distribution as shown in FIG. 10 (b). It will be seen in FIG. 10 (b) that a flux distortion due to the presence of the small N and S poles occurs in the flux-flow inversion resion at the boundary between each of the large S poles and the next large N pole.

Stator coils $l_1$ and $l_2$ are disposed around the rotor 1' at an angular interval of 180°. When the electrical angle relative to an angular position of rotation of the rotor 1' is taken as a basis, these stator coils $l_1$ and $l_2$ are disposed in a relation displaced from each other by an electrical angle of 180°. For simplicity of description, however, the stator coils $l_1$ and $l_2$ are shown in FIGS. 1 (c) and 10 (d) to have an exaggerated width and to be closer toward each other than the actual interval, although they are displaced relative to each other by the electrical angle of 180°.

In FIG. 10, the direction of rotation of the rotor 1' is from the right toward the left on the drawing sheet. However, for conveniences of description, it is supposed that the stator coils $l_1$ and $l_2$, instead of the rotor 1', move from the left toward the right on the drawing sheet, as in the case of the arrangement shown in FIG. 2.

Figure 11:
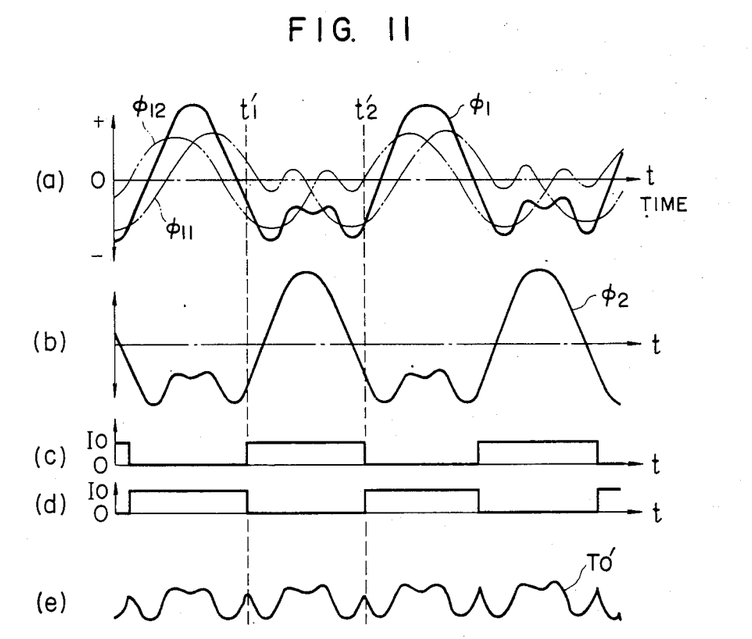
FIG. 11 illustrates how the magnetic flux density distribution changes with time and shows also the relation between the coil drive current and the produced torque in the motor shown in FIG. 10.

When the drive current is supplied to the stator coil $l_1$, the magnetic flux density crossed by the leading end $p_1$ of the stator coil $l_1$ changes as shown by the one-dot chain curve $\phi_{11}$ in FIG. 11 (a) with the movement of the stator coil $l_1$ relative to the rotor 1'. Similarly, the magnetic flux density crossed by the leading end $p_2$ of the stator coil $l_2$ changes as shown by the two-dot chain curve $\phi_{12}$ in FIG. 11 (a). Accordingly, the sum of these magnetic fluxes $\phi_{11}$ and $\phi_{12}$ crossed by the stator coil $l_1$ to produce the rotation torque rotating the rotor 1' changes as shown by the solid curve $\phi_1$ in FIG. 11 (a).

On the other hand, the stator coil $l_2$ is displaced relative to the stator coil $l_1$ by the electrical angle of 180°. Accordingly, the sum of the magnetic fluxes crossed by the stator coil $l_2$ changes as shown by the solid curve $\phi_2$ in FIG. 11 (b), and this magnetic flux $\phi_2$ has its phase shifted by 180° from that of the magnetic flux $\phi_1$ crossed by the stator coil $l_1$.

The stator coils $l_1$ and $l_2$ are alternately energized when each of them moves over the electrical angle of 180°. In the prior art motor driving circuit, the drive currents $I_0$ supplied to the stator coils $l_1$ and $l_2$ have the equal amplitude. In the invention, the drive current $I_0$ supplied to the stator coil $l_1$ is shown in FIG. 11 (c), and the drive current $I_0$ supplied to the stator coil $l_2$ is shown in FIG. 11 (d).

Thus, when the predetermined drive current $I_0$ starts to be supplied to the stator coil $l_1$ while interrupting the current supply to the stator coil $l_2$ at time $t_1'$ at which the stator coils $l_1$ and $l_2$ take the relative positions shown in FIG. 10 (c), a rotation torque proportional to the product of the drive current $I_0$ and the magnetic flux $\phi_1$ is produced on the rotor 1' to cause rotation of the rotor 1', thereby causing relative movement of the stator coils $l_1$ and $l_2$. Then, at time $t_2'$ at which the stator coils $l_1$ and $l_2$ reach the relative positions shown in FIG. 10 (d) as a result of movement over the electrical angle of 180°, the current supply to the stator coil $l_1$ is interrupted, and the predetermined drive current $I_0$ starts to be supplied to the stator coil $l_2$ in turn. A rotation torque proportional to the product of the drive current $I_0$ and the magnetic flux $\phi_2$ is produced on the rotor 1' to cause further rotation of the rotor 1', thereby causing further relative movement of the stator coils $l_1$ and $l_2$.

In the manner described above, the current supply to the stator coils $l_1$ and $l_2$ is switched over each time they move over the electrical angle of 180° so that the torque is continuously developed to cause continuous rotation of the rotor 1'. In this case, as will be apparent from FIGS. 11 (a) to 11 (d), each of the stator coils $l_1$ and $l_2$ is energized in the period in which the magnetic flux distortion occurs due to the presence of the small N and S poles of the rotor 1' Such a period is selected so that the torque is produced at the flattest possible portions of the magnetic fluxes $\phi_1$ and $\phi_2$ emanating from the rotor 1', and the resultant torque $T_O$ produced to cause continuous rotation of the rotor 1' has a waveform as shown in FIG. 11 (e).

However, even when the small N and S poles are provided in the rotor 1' as described above, the magnetic fluxes $\phi_1$ and $\phi_2$ crossed by the stator coils $l_1$ and $l_2$ do not include exactly flat portions as seen in FIGS. 11 (a) and 11 (b), and, since the drive currents $I_O$ supplied to the stator coils $l_1$ and $l_2$ are constant, the resultant torque $T_O'$ produced to cause continuous rotation of the rotor 1' includes inevitably a torque ripple as shown in FIG. 11 (e).

Figure 12:
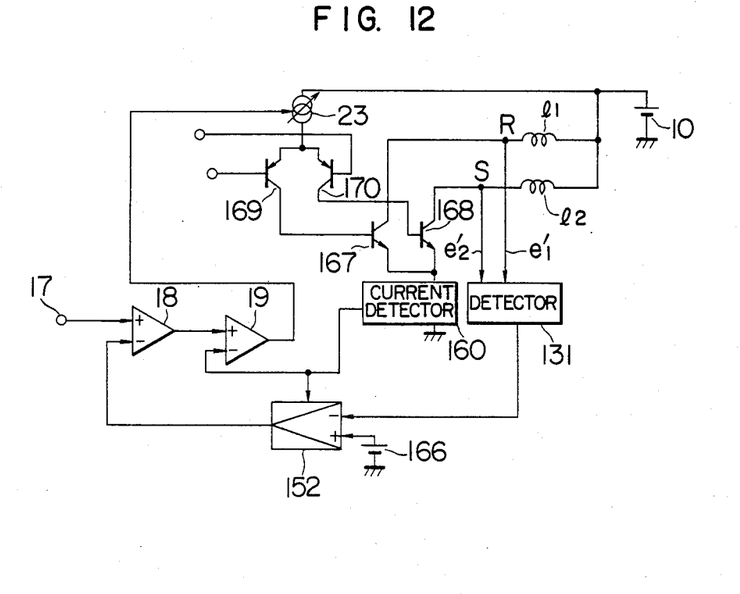
FIG. 12 is a block diagram of an embodiment of the apparatus for driving such a single-phase brushless DC motor.

Another embodiment of the present invention shown in FIG. 12 is provided to eliminate such a torque ripple appearing in the rotation torque of the single-phase brushless DC motor.

Referring to FIG. 12, each time the stator coils $l_1$ and $l_2$ move over the electrical angle of 180°, a rotor position detector (not shown) generates a rotor position signal, and, in response to the rotor position signal, a signal generator (not shown) generates a signal triggering the bases of transistors 169 and 170 thereby alternately turning on and off the transistors 169 and 170. When now the transistor 169 is turned on, the transistor 170 is turned off, and the base current is supplied from a current source 23 to a transistor 167 acting as a linear amplifier (non-saturated drive) element, so that the drive current which is $h_{FE}$ times as large as the base current flows through the route including the stator coil $l_1$ and the transistor 167 to be detected by a current detector 160. This current detector 160 may be a resistor having a very small resistance value similar to the resistor 16 incorporated in the embodiments shown in FIGS. 4, 8 and 9, or it may be any other suitable current detector.

Then, when the stator coils $l_1$ and $l_2$ move over another electrical angle of 180°, the transistor 169 is turned off while turning on the transistor 170, and the base current is supplied from the current source 23 to a transistor 168 acting as a linear amplifier element. Consequently, the drive current $I_O$ is supplied to the stator coil $l_2$.

With the movement of the stator coils $l_1$ and $l_2$, a counter-electromotive force (voltage) due to the magnetic flux $\phi_1$ shown in FIG. 11 (a) is induced in the stator coil $l_1$, and this counter-electromotive force changes in a manner similar to that of the magnetic flux $\phi_1$. Similarly, a counter-electromotive force (voltage) due to the magnetic flux $\phi_2$ shown in FIG. 11 (b) is induced in the stator coil $l_2$ and changes in a manner similar to that of the magnetic flux $\phi_2$. Consequently, a voltage $e_1'$ which is the sum of the counterelectromotive force induced in the stator coil $l_1$ and the voltage drop due to the internal resistance of the stator coil $l_1$ appears at one end R of the stator coil $l_1$. Also, a voltage $e_2'$ which is the sum of the counter-electromotive force induced in the stator coil $l_2$ and the voltage drop due to the internal resistance of the stator coil $l_2$ appears at one end S of the stator coil $l_2$.

These voltages $e_1'$ and $e_2'$ are detected by a detector 131 in a manner as described already with reference to FIG. 8 or 9, and a detection output $e_a'$ appears from the detector 131. In this case, as will be apparent from FIGS. 11 (a) and 11 (b), the stator coil $l_1$ is energized in the period in which the counterelectromotive force induced in the stator coil $l_1$ and having the waveform corresponding to the magnetic flux $\phi_1$ is smaller than the counter-electromotive force induced in the stator coil $l_2$ and having the waveform corresponding to the magnetic flux $\phi_2$. Similarly, the stator coil $l_2$ is energized in the period in which the latter counter-electromotive force is smaller than the former one. Therefore, the component included in the detection output voltage $e_a'$ and resulting from the induced counter-electromotive force has a waveform corresponding to the torque ripple appearing in the torque rotating the rotor 1'.

Figure 13:
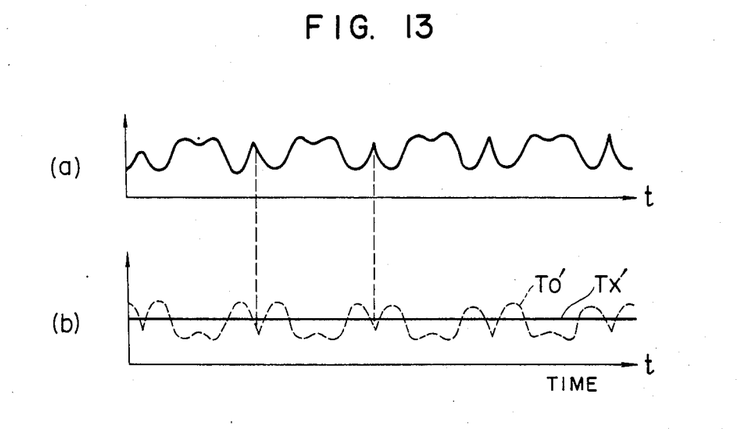
FIG. 13 is a waveform diagram for illustrating how the torque ripple is compensated by the apparatus shown in FIG. 12.

A variable gain amplifier 152 and differential amplifiers 18, 19 disposed in the succeeding stages of the detector 131 operate in a manner as described with reference to the aforementioned embodiments. Thus, the current source 23 is controlled by the output voltage of the amplifier 19 so that the drive current supplied to the stator coils $l_1$ and $l_2$ changes according to the torque ripple appearing in the torque rotating the rotor 1', as shown in FIG. 13 (a). Therefore, although a torque $T_O'$ including a torque ripple as shown by the broken curve in FIG. 13 (b) has been produced when the predetermined current $I_O$ is supplied to the stator coils $l_1$ and $l_2$, the torque ripple is cancelled to provide a constant torque $T_x'$ as shown by the solid line in FIG. 11 (b).

The embodiment of the present invention shown in FIG. 12 illustrates an application of the present invention to an apparatus in which the motor rotation speed need not be variable. Therefore, a predetermined DC voltage is applied from a DC source 166 to the variable gain amplifier 152 in lieu of the information of the motor rotation speed (the output of the LPF 14 in FIG. 4). It is apparent, however, that the apparatus can deal with any desired motor speed setting when, in lieu of the DC voltage of the DC source 166, a signal indicative of the rotation speed of the motor is derived on the basis of the detected counter-electromotive forces for controlling the gain of the variable gain amplifier 152 as in the case of the embodiments shown in FIGS. 4, 8 and 9.

While preferred embodiments of the present invention when applied to three-phase and single-phase brushless DC motors have been described by way of example, it is apparent that the present invention is equally effectively applicable to brushless DC motors having any other number of phases.

Preferred embodiments of the present invention are in no way limited to those described above, and those skilled in the art may be able to make various modifications on the basis of the disclosure of the specification and drawings. For example, the transistors 4 to 6, which are shown in FIGS. 4 and 8 and adapted to operate in the saturation drive mode to act as on-off control switches, may be replaced by any other suitable switching devices having similar functions. Further, the remaining transistors 7 to 9 and 20 to 22 may be replaced by any other suitable elements such as field effect transistors or thyristors. Therefore, when the stator coils $L_1$ to $L_3$ are driven by a thyristor inverter, and the thyristor inverter is controlled by the signal generator 12, the effect will be similar to that described with reference to the embodiment shown in FIG. 4.

Therefore, the preferred embodiments described in the specification are not limitative at all. The scope of the present invention is specified in the appended claims, and all of modifications falling within the scope of the claims are included in the present invention.

We claim:

1. An apparatus for driving a brushless motor including a rotor and a plurality of stator coils, said apparatus comprising:

means for detecting the angular position of rotation of said rotor;

signal generating means responsive to the application of the detected position signal from said position detecting means for generating a control signal for controlling of current feeding to each of said stator coils of said motor in predetermined order;

a motor driving circuit for supplying a motor drive current from a power source to each of said stator coils of said motor under control of the control signal generated from said signal generating means;

a compensation signal generating circuit which detects counter-electromotive forces induced in said stator coils when said drive current flows through said coils, and generates a signal for compensating a torque ripple of the rotation torque in said motor according to a signal indicative of the detected counter-electromotive forces; and a current control circuit receiving said torque ripple compensation signal and a command signal commanding a predetermining rotation speed of said motor, superposing said torque ripple compensation signal on said command signal, and controlling the motor drive current supplied through said motor driving circuit according to the superposed signal.

2. An apparatus for driving a brushless motor as claimed in claim 1, wherein said compensation signal generating circuit detects the counter-electromotive forces induced in said stator coils thereby producing a signal indicative of the detected counter-electromotive forces and a signal indicative of the rotation speed of said motor, and, on the basis of said signal indicative of the detected counter-electromotive forces and said signal indicative of the rotation speed of said motor, generates said compensation signal compensating the torque ripple of the rotation torque in said motor.

3. An apparatus for driving a brushless motor as claimed in claim 2, wherein said signal indicative of the rotation speed of said motor is produced on the basis of the DC level of said signal indicative of the detected counter-electromotive forces.

4. An apparatus for driving a brushless motor as claimed in claim 3, wherein said compensation signal generating circuit includes means for detecting the drive current supplied to said motor, a detector detecting the counter-electromotive forces induced in said stator coils, filter means for extracting the DC level of the detection output of said detector, and a variable gain amplifier receiving the detection output of said detector as its input signal and controlling the amplification of the input signal on the basis of the detection output of said drive current detecting means and the DC level derived by said filter means, thereby generating said compensation signal.

5. An apparatus for driving a brushless motor as claimed in claim 4, wherein said compensation signal generating circuit further includes internal-resistance compensating means for subtracting the voltage drop due to the internal resistances of said stator coils from the detection output said detector, and the subtracted signal is applied to said compensation signal generating circuit as said input signal.

6. An apparatus for driving a brushless motor as claimed in claim 2, wherein said compensation signal generating circuit includes means for detecting the drive current, and for producing said compensation signal on the basis of said detected drive current and said signals indicative of the detected counter-electromotive forces and indicative of the rotation speed of said motor.

7. An apparatus for driving a brushless motor as claimed in claim 1, wherein said motor driving circuit includes a plurality of sets each including at least one switching means connected in series with at least one current control element, the number of said sets being equal to the number of the phases and each set driving the associated one of said stator coils; said switching means and said current control elements are driven under control of the control signal generated from said signal generating circuit in such a relation that the counterelectromotive forces induced in said stator coils are fixed at the voltage level of said power source in response to the turning-on of the associated ones of said switching means, while said current control elements are linearly driven by the control signal of said signal generating means; and wherein said compensation signal generating circuit includes detector means for detecting the lower level of the voltage waveform induced in each of said stator coils, thereby generating said torque ripple compensation signal on the basis of the output of said detector means.

8. An apparatus for driving a brushless motor as claimed in claim 7, wherein said switching means and said current control elements are bipolar transistors.

9. An apparatus for driving a brushless motor as claimed in claim 7, wherein said switching means and said current control elements are field effect transistors.

10. An apparatus for driving a brushless motor as claimed in claim 7, wherein said switching means and said current control elements are thyristors. motor as eans and 11. An apparatus for driving a brushless motor as claimed in claim 1, wherein said motor driving circuit includes a plurality of sets each including at least two current control elements connected in series, the number of said sets being equal to the number of the phases and each set driving the associated on of said stator coils; said current control elements are linearly driven by the control signal generated from said signal generating means; and wherein said compensation signal generating circuit includes detector means for detecting the upper level and lower level of the voltage waveform induced in each of said stator coils, thereby generating said torque ripple compensation signal on the basis of the difference between said two detection outputs of said detector means.

12. An apparatus for driving a brushless motor as claimed in claim 11, wherein said switching means and said current control elements are bipolar transistors.

13. An apparatus for driving a brushless motor as claimed in claim 11, wherein said switching means and said current control elements are field effect transistors.

14. An apparatus for driving a brushless motor as claimed in claim 11, wherein said switching means and said current control elements are thyristors.

15. An apparatus for driving a brushless motor including a rotor and a plurality of stator coils, said apparatus comprising:

means for detecting the angular position of rotation of said rotor;

signal generating means responsive to the application of the detected position signal from said position detecting means for generating a control signal for controlling of current feeding to each of said stator coils of said motor in predetermined order;

a motor driving circuit for supplying a motor drive current from a power source to each of said stator coils of said motor under control of the control signal generated from said signal generating means;

means for detecting counter-electromotive forces induced in said stator coils when said drive current flows through said coils;

means connected to said counter-electromotive forces detecting means for producing a signal indicative of the rotation speed of said motor on the basis of the detected counter-electromotive forces;

means for detecting the drive current supplied to said motor;

variable gain amplifying means receiving the detected counter-electromotive forces and said signal indicative of the rotation speed as its input signal for controlling the amplification of the input signal on the basis of the detected counter-electromotive forces and said signal indicative of the rotation speed and for generating a signal for compensating a torque ripple of the rotation torque in said motor; and a current control circuit receiving said torque ripple compensation signal and a command signal commanding a predetermined rotation speed of said motor, superposing said torque ripple compensation signal on said command signal, and controlling the motor drive current supplied through said motor driving circuit according to the superposed signal.

* * * * *